United States Patent [19]
Foley et al.

[11] 3,839,236
[45] Oct. 1, 1974

[54] TERTIARY CONDENSATION PRODUCT OF PHENOL, FORMALDEHYDE AND A SILANE

[75] Inventors: Kevin M. Foley, Hebron; Frank P. McCombs, Granville; Francesco M. Vigo, Heath, all of Ohio

[73] Assignee: Owens-Corning Fiberglas Corporation, Toledo, Ohio

[22] Filed: Aug. 23, 1973

[21] Appl. No.: 390,980

[52] U.S. Cl. .................. 260/2 S, 161/93, 161/170, 260/55, 260/57 R, 260/57 C
[51] Int. Cl. ........................................... C08g 31/04
[58] Field of Search.......... 260/55, 57 R, 2 S, 57 C; 161/93, 170

[56] References Cited
UNITED STATES PATENTS

| 3,464,956 | 9/1969 | Petersen............................ 260/57 R |
| 3,494,892 | 2/1970 | Huster............................... 260/57 R |
| 3,616,179 | 10/1971 | McCombs et al................... 260/840 |

*Primary Examiner*—Melvyn I. Marquis
*Attorney, Agent, or Firm*—Carl G. Staelin; John W. Overman; Patrick P. Pacella

[57] ABSTRACT

A tertiary condensation product of phenol, formaldehyde and a silane containing an aromatic group substituted with oxygen is disclosed. The product can be cured with a boron-containing material and is a suitable binder composition for glass fibers.

13 Claims, No Drawings

TERTIARY CONDENSATION PRODUCT OF PHENOL, FORMALDEHYDE AND A SILANE

This invention relates to a composition of matter formed by reacting phenol, a silane and an aldehyde. It further relates to curing the resulting composition with a boron-containing material.

Phenol-formaldehyde condensation products and their use as binders in glass fiber products are well known in the art. In general, the condensation products are produced by reacting one of more moles of formaldehyde with one mole of phenol in an aqueous system in the presence of an alkaline catalyst. After the free formaldehyde content is reduced to a certain percentage, amino-compounds, urea dicyandiamide and the like are added and reacted with the remaining free formaldehyde. After neutralizing with an acid, additives such as oils, silanes and water are added to the resulting reaction products to produce binder compositions suitable for application to glass fibers.

The glass fibers impregnated with the binder generally are passed through an oven where they are compressed to a selected thickness and density and permanently established by heat setting or curing the binder. As a result of the heat setting, the resulting product often is discolored to a brown or yellow color. For acoustical wall, ceiling or partition panels, such discoloring is undesirable for aesthetic reasons.

Applicants now have discovered tertiary condensation products of phenol, formaldehyde and a silane. After curing with a boron-containing material, a white solid is obtained. The surface of the solid exposed to air has been found to be especially white.

Accordingly, an object of this invention is to provide tertiary condensation products of phenol, formaldehyde and a silane.

Other objects, aspects and advantages of this invention will be apparent to one skilled in the art from the following disclosure and appended claims.

The silanes employed in this invention contain an aromatic group substituted with oxygen. Methods for their preparation are disclosed in U.S. Pat. application Ser. No. 347,264 filed Apr. 2, 1973. These silanes are represented by the formula:

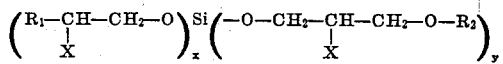

wherein X is a halogen, $R_1$ is hydrogen or an alkyl radical having one to 20 carbon atoms, $R_2$ is phenyl or a substituted derivative of phenyl, $x$ is the integer 2 or 3 and $y$ is the integer 1 or 2. Preferably X is chlorine, $R_1$ is hydrogen or alkyl radical having one to 10 carbon atoms, $R_2$ is phenyl, $x$ is the integer 3 and $y$ is the integer 1. A preferred silane is a compound represented by the formula:

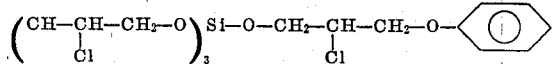

The silanes employed in this invention also are represented by the formula:

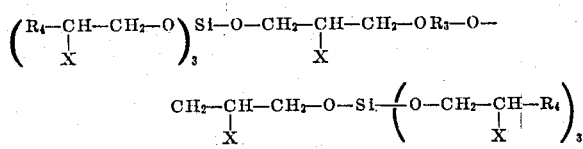

wherein $R_3$ is phenylene or the radical

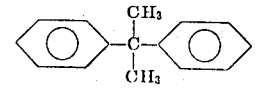

$R_4$ is hydrogen or an alkyl radical having one to 20 carbon atoms and X is a halogen. Preferably $R_4$ is hydrogen or an alkyl radical having one to 10 carbon atoms and X is chlorine. Preferred silanes are compounds represented by the formula:

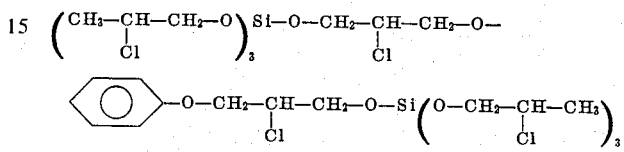

and

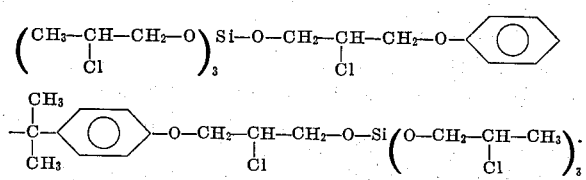

The tertiary condensation products of this invention generally have an initial mole ratio of formaldehyde to phenol ranging from 1.1/1 to 4.4/1. Preferably, this mole ratio ranges from 2.7/1 to 4.4/1. The tertiary condensation product of this invention contains 0.5 to 10.0 percent by weight of silane based on the total weight of solids, preferably 1.0 to 7.0 percent.

The curing agents employed in this invention are boron-containing materials. Specific examples of these boron-containing materials are borax ($Na_2B_4O_7 \cdot 10 H_2O$), anhydrous borax ($Na_2B_4O_7$), boric acid ($H_3BO_3$), ammonium pentaborate ($(NH_4)_2B_{10}O_{16} \cdot 8H_2O$), boron phosphate ($BPO_4$), boron phosphide (BP), boron trifluoride ($BF_3$), boron trifluoride etherate ($BF_3$–$CH_3OH$), boron trifluoride monomethylamine ($BF_3$–$C_2H_5NH_2$), and the like and mixtures thereof. Preferably, boric acid, ammonium pentaborate or borax are employed.

The amount of boron containing material ranges from 1.0 to 15.0 percent by weight based on the total weight of solids, preferably 1.0 to 5.0 percent.

The tertiary condensation products of this invention can be prepared by a variety of methods. In one method, phenol-formaldehyde resins are prepared by convention methods such as those described in U.S. Pat. No. 3,616,179. The phenol-formaldehyde resins then are mixed with the silanes and boron-containing materials of this invention. The mixture is cured at elevated temperatures and the result is a white or off white product. When this type of method is employed, the silane is emulsified with water and surfactants based on nonionic, cationic and anionic types of alkylaryl polyether alchols, sulfates.

Alternatively, the phenol, formaldehyde and silane can be directly co-reacted. When this process is employed, emulsification of the silane is not necessary. Curing is carried out by adding a boron containing material to the final product and heating. The resulting product is a white or off white color.

The tertiary condensation products of this invention can be used as the binder in glass wool to give a white glass wool product. A white glass wool product would be especially useful in acoustical ceiling panels for aesthetic reasons.

The products of this invention also can be used as film formers or molding compounds. When used as molding compounds, the tertiary condensation products can be used alone or with suitable fillers or reinforcements. For molding compounds, best results are obtained by directly coreacting the silane with the phenol and formaldehyde.

The advantages of this invention further are illustrated by the following examples. The reactants, proportions and other specific conditions are presented as being typical and should not be construed to limit the invention unduly.

EXAMPLE I

Five grams of

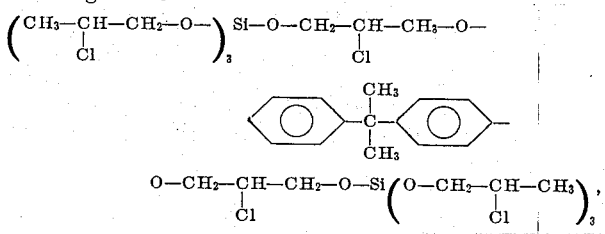

187 grams of phenol and 18 grams of barium monohydrate were charged to a reactor, mixed and heated to 60°C. Two hundred sixteen grams of 37 percent formaldehyde then was added keeping the temperature below 80°C. This was followed by the addition of 85 grams of paraformaldehyde. The reaction then was heated to 80°C for 90 minutes and cooled to give the final product.

A 10 gram sample of this product was cured with 1 gram of boric acid in an aluminum dish. The sample was cured at 155°C for 15 minutes. A white solid was obtained, which exhibited good retention of integrity after being exposed to boiling water for 10 minutes.

EXAMPLE II

The process of Example I was repeated except that the following silane was employed:

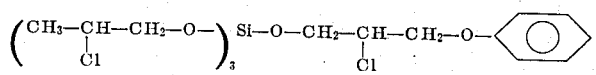

Two 10 gram samples were cured according to the procedure of Example I with 1.0 and 1.5 grams of boric acid respectively. Both examples exhibited good retention of integrity after being exposed to boiling water for 10 minutes. The samples were an off-white color.

EXAMPLE III

A 10 gram sample of phenol-formaldehyde resin was placed in an aluminum dish. The resin was prepared by conventional methods employing a 2.7 to 1 mole ratio of formaldehyde to phenol. The sample was 45 percent by weight solids. To this was added 1.0 grams of boric acid followed by 0.3 grams of an emulsion prepared from 1 part water, 1 part

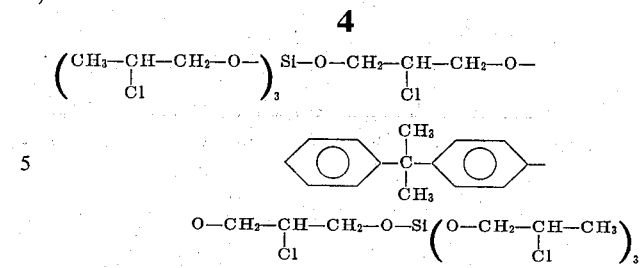

and 0.1 part emulsifying agent of octylphenoxypolyethoxyethanol. The resulting material was cured at 155°C for 40 minutes. The resulting product was a uniform off-white solid, with the surface of the solid exposed to air being especially white.

EXAMPLE IV

The process of Example III was repeated except that ammonium pentaborate was employed instead of boric acid and the order of addition of the silane emulsion and boron-containing material was reversed. The resulting product was a solid with an off-white color.

EXAMPLE V

The process of Example III was repeated except that no silane material was employed. The side of the sample exposed to air during the cure was colored a light shade of yellow.

EXAMPLE VI

The process of Example III was repeated except that the emulsion was prepared with 2 parts of the silane and that the sample was cured on an iron screen. Three days after curing, the sample still retained its white or off-white color.

A comparison of Examples III and V reveals that the products of this invention are white or off-white solids after curing and do not possess the yellow discoloration of most phenol-formaldehyde resins which have been cured. A comparison of Example III and VI reveals that the products of this invention retain their whiteness even under severe test conditions, i.e., the presence of Fe ions.

Although this invention has been described in considerable detail, it must be understood that such detail is for the purposes of illustration only and that many variations and modifications can be made by one skilled in the art without departing from the scope and spirit thereof.

We claim:

1. A tertiary condensation product formed by reacting, in an aqueous system in the presence of an alkaline catalyst, formaldehyde, phenol and a silane containing an aromatic group substituted with oxygen wherein the formaldehyde and phenol have an initial mole ratio of formaldehyde to phenol ranging from 1.1/1 to 4.4/1 and the tertiary condensation product contains 0.5 to 10.0 percent by weight of the silane based on total weight of solids, wherein the silane is represented by the formula:

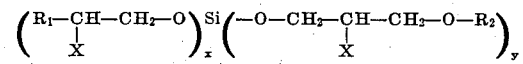

wherein X is a halogen, $R_1$ is hydrogen or an alkyl radical having one to 20 carbon atoms, $R_2$ is phenyl or a substituted derivative of phenyl, $x$ is the integer 2 or 3 and $y$ is the integer 1 or 2, or the formula:

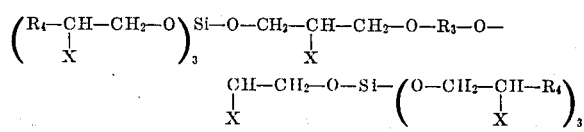

wherein $R_3$ is phenylene or the radical

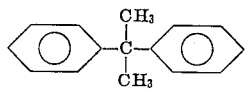

$R_4$ is hydrogen or an alkyl radical having one 20 carbon atoms and X is as previously defined, and wherein the product is cured with 1.0 to 15.0 percent by weight based on total weight of solids of boron-containing materials.

2. A tertiary condensation product according to claim 1 wherein the product is white or off-white in color.

3. A tertiary condensation product according to claim 1 wherein the percent of boron-containing material ranges 1.0 to 5.0.

4. A tertiary condensation product according to claim 1 wherein the boron-containing material is borax, boric acid or ammonium pentaborate.

5. A tertiary condensation product according to claim 1 wherein the mole ratio of formaldehyde to phenol ranges from 2.7/1 to 4.4/1 and the percent of silane ranges from 1.0 to 7.0.

6. A tertiary condensation product according to claim 1 wherein X is chlorine, $R_1$ is hydrogen or an alkyl radical having one to 10 carbon atoms, $R_2$ is phenyl, $x$ is the integer 3 and $y$ is the integer 1.

7. A tertiary condensation product according to claim 1 wherein the silane is represented by the formula:

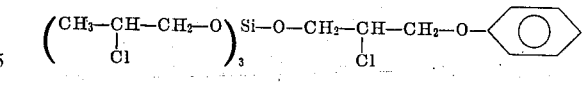

8. A tertiary condensation product according to claim 1 wherein $R_4$ is hydrogen or an alkyl radical having one to 10 carbon atoms and X is chlorine.

9. A tertiary condensation product according to claim 1 wherein the silane is represented by the formula:

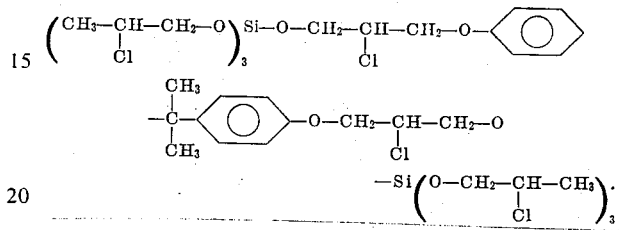

10. A tertiary condensation product according to claim 1 wherein the silane is added with the boron-containing material rather than be directly co-reacted with the phenol and formaldehyde.

11. A tertiary condensation product according to claim 1 wherein the boron-containing materials are borax, anhydrous borax, boric acid, ammonium pentaborate, boron phosphate, boron phosphide, boron trifluoride, boron trifluoride etherate, or boron trifluoride monomethylamine.

12. A glass wool product formed of glass fibers and a hardenable resinous binder composition on the surface of the fibers, wherein the binder composition comprises the tertiary condensation product of claim 1.

13. A glass wool product according to claim 12 wherein the glass wool product is white or off-white in color.

* * * * *